(12) United States Patent
Cherepov et al.

(10) Patent No.: US 7,644,271 B1
(45) Date of Patent: Jan. 5, 2010

(54) ENFORCEMENT OF SECURITY POLICIES FOR KERNEL MODULE LOADING

(75) Inventors: Mikhail Cherepov, Lexington, MA (US); Yan Chen, Boonton Township, NJ (US)

(73) Assignee: Cisco Technology, Inc., San Jose, CA (US)

( * ) Notice: Subject to any disclaimer, the term of this patent is extended or adjusted under 35 U.S.C. 154(b) by 816 days.

(21) Appl. No.: 11/268,232

(22) Filed: Nov. 7, 2005

(51) Int. Cl.
*H04L 29/06* (2006.01)
*G06F 12/14* (2006.01)
*G06F 12/16* (2006.01)

(52) U.S. Cl. ............................ 713/164; 726/22; 726/23; 726/24

(58) Field of Classification Search .................... 726/22, 726/23, 24; 713/164
See application file for complete search history.

(56) References Cited

U.S. PATENT DOCUMENTS

| | | | |
|---|---|---|---|
| 6,836,888 B1 * | 12/2004 | Basu et al. .................. | 718/104 |
| 7,024,694 B1 * | 4/2006 | Ko .............................. | 726/23 |
| 2004/0250086 A1 | 12/2004 | Maucher ..................... | 713/187 |
| 2005/0005101 A1 * | 1/2005 | Yenduri ....................... | 713/164 |
| 2006/0150256 A1 * | 7/2006 | Fanton et al. ................ | 726/27 |

OTHER PUBLICATIONS

Pourzandi, Makan et al. "Stop Malicious Code Execution at the Kernel Level", Dec. 2003.*
Wright, Chris et al. "Linux Security Modules: General Security Support for the Linux Kernel", 2002.*
"(nearly) Complete Linux Loadable Kernel Modules," Mar. 1999, http://packetstorm.linuxsecurity.com/docs/hack/LKM_HACKING.html.

* cited by examiner

*Primary Examiner*—Michael J Simitoski
(74) *Attorney, Agent, or Firm*—BainwoodHuang

(57) ABSTRACT

A method and computer program product for providing enforcement of security policies for kernel module loading is presented. File paths for shared library executable files opened by user processes are cached. When a request to load a kernel loadable module (KLM) is received, a previously cached file path for said KLM is retrieved, said file path mapping a location of an executable file from which said KLM was produced. A security policy is applied to said file path, wherein when said file path triggers a security policy rule then an action associated with a triggered rule is taken, and wherein when said file path does not trigger a security policy rule then said KLM request is allowed to proceed.

18 Claims, 4 Drawing Sheets

ENFORCEMENT OF SECURITY POLICIES FOR KERNEL MODULE LOADING

BACKGROUND

Computer systems, networks and data centers are exposed to a constant and differing variety of attacks that may compromise the security and/or operation of the system. Examples include various forms of malicious software program attacks such as viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Virus attacks, worm attacks, and Trojan horse attacks are variants of each other that generally involve the execution of a program, for which a user often is unaware of its existence, that performs some undesired processing operations to comprise a computer's proper operation.

Other malicious programs operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computers to silently obtain otherwise confidential information such as usernames and passwords required to access protected data, lists, contents of files or even a remote web site's user account information.

Computer system developers, software developers and security experts have produced many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM, which a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include denial-of-service attacks, buffer overflow operations, execution of malformed application data, and execution of malicious mobile code. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of service attacks may also seek to crash the targeted machine, rather than simply consume resources. Buffer overflow attacks occur when programs do not provide appropriate checks of data stored in internal data structures within the software that result in overwriting of surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks or allowing data stream parsing errors.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

Another type of computer attack (known as rootkits) employs kernel-level components to compromise systems, then hide their tracks. This is often done by loading rootkit kernel modules into the host Operating System (OS), e.g., "/sbin/insmod/tmp/haxor" on Linux. Thus, Host Intrusion Prevention Systems (HIPS) attempt to ensure that a protected host loads only those kernel modules allowed by security policies. The general idea is to hook a kernel routine in the module-loading path; when a user action invokes this path; the hook takes control to verify that the about-to-be-loaded module conforms to the security policy.

Some operating systems try to authenticate kernel modules. Examples included Driver Signing in Microsoft Windows, whose purpose is stability as much as security. HIPS on Windows and Solaris has been using kernel-level hooking, Rule Engine and Management Console (MC) policy-based mechanisms to control and verify file paths of module executables.

A shim, as known in the art, is a relatively small ancillary piece of software that can be added to an operating system. The shim intercepts specified actions or data at one interface, replicate these at a second interface, and also forward the intercepted items to an interface to a monitoring application. One well-known application programming interface (API) used in network communications is the Transport Data Interface or TDI, and thus one example of a shim is a TDI shim. Certain systems may employ a file server (FS) shim.

In certain operating systems (e.g., Linux) a loader (e.g., Insmod) is used to install loadable kernel module in the running kernel. The loader tries to link a module into the running kernel by resolving all symbols from the kernel's exported symbol table. If the module file name is given without directories or extension, the loader will search for the module in some common default directories.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
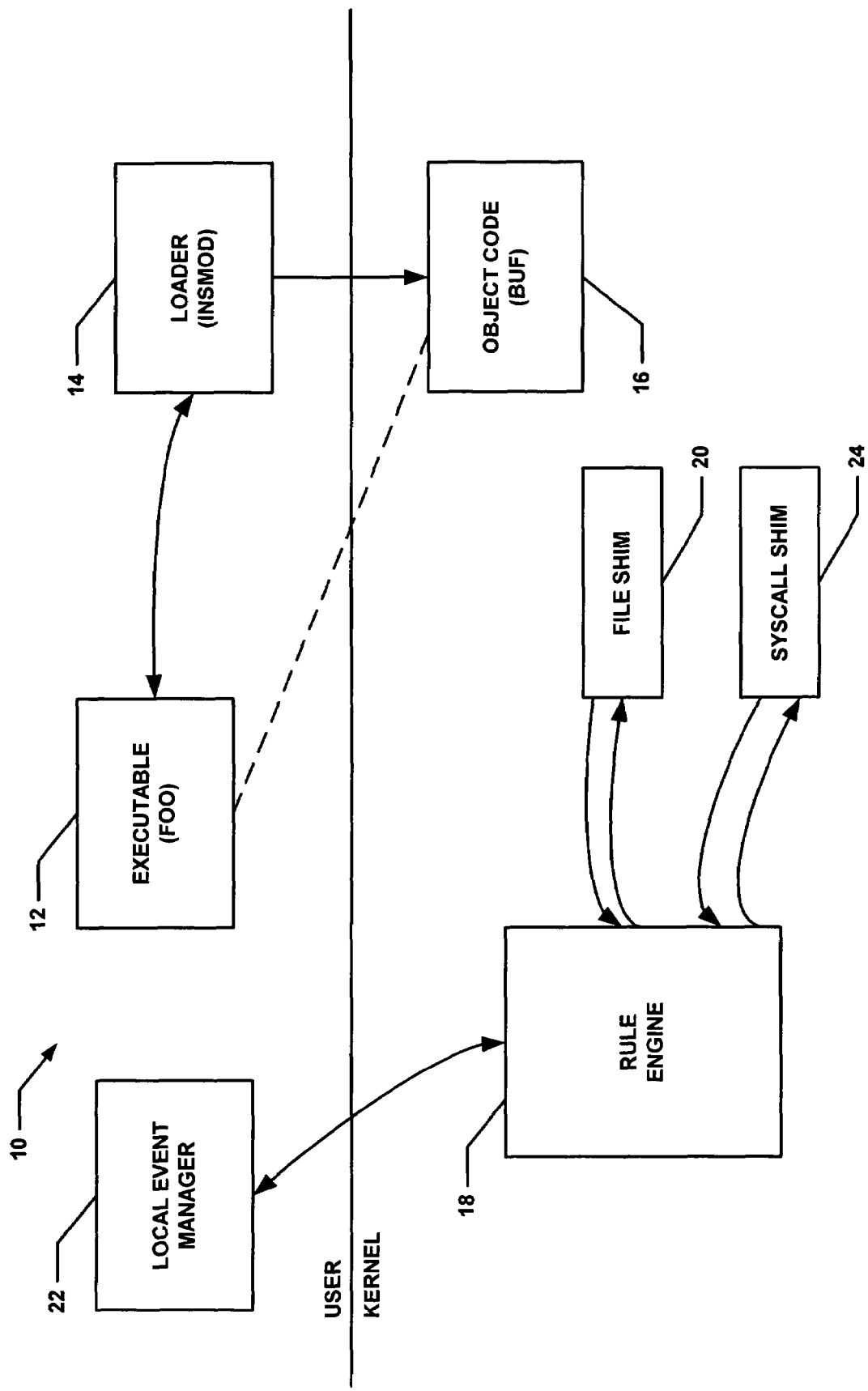
FIG. 1 illustrates a block diagram of a particular embodiment of a software system that performs enforcement of security policies for kernel module loading in accordance with embodiments of the invention.

Conventional mechanisms for authenticating kernel modules such as those explained above suffer from a variety of deficiencies. One such deficiency is that signature-based solutions tend to be quite limiting in practice, therefore it is quite common for users to load unsigned drivers. Further, signature-based solutions tend to be rigid and difficult or impractical to enforce in dynamic environments like user desktops. In certain operating systems, a module file name may be requested without a file path (the module name can be arbitrary and not related to the executable's path, or the load syscall is separate from the file open syscall), making verification of the file path difficult. For example, Linux presents a particular challenge to this approach, as its module-load system call lacks the information about the file path of the executable being loaded.

Embodiments of the invention significantly overcome such deficiencies and provide mechanisms and techniques that provide enforcement of security policies for kernel module loading.

This may be accomplished by using HIPS to control kernel module loading using its powerful framework of rules. It also has lower maintenance costs and fewer false positives than signature-based approaches. This solution can easily be extended by hash-matching for near-foolproof matching of the loaded module binary with one of the module files opened by the module-loading program. Thus, the present invention provides a system the ability to track a kernel module binary being loaded by the OS back to the specific module executable in the file system. This enables HIPS policy-based intrusion prevention for kernel modules similar to policies for file operations. Stated differently, uniform CSA control rules can be applied to module load operations.

In a particular embodiment of a method for providing enforcement of security policies for kernel module loading, the method includes caching file paths for shared library executable files opened by user processes. Next, a request to load a kernel loadable module (KLM) is received. A previously cached file path for the KLM is retrieved, the file path mapping a location of an executable file from which the KLM was produced. A security policy is applied to the file path, wherein when the file path triggers a security policy rule then an action associated with a triggered rule is taken, and wherein when the file path does not trigger a security policy rule then the KLM request is allowed to proceed.

Other embodiments include a computer readable medium having computer readable code thereon for providing enforcement of security policies for kernel module loading. The computer readable medium includes instructions for caching file paths for shared library executable files opened by user processes, as well as instructions for receiving a request to load a kernel loadable module (KLM). The medium additionally includes instructions for retrieving a previously cached file path for the KLM, the file path mapping a location of an executable file from which the KLM was produced. The medium further includes instructions for applying a security policy to the file path, wherein when the file path triggers a security policy rule then an action associated with a triggered rule is taken, and wherein when said file path does not trigger a security policy rule then the KLM request is allowed to proceed.

Still other embodiments include a computerized device, configured to process all the method operations disclosed herein as embodiments of the invention. In such embodiments, the computerized device includes a memory system, a processor, and a communications interface in an interconnection mechanism connecting these components. The memory system is encoded with a process that provides enforcement of security policies for kernel module loading as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing enforcement of security policies for kernel module loading as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

Referring now to FIG. 1, a block diagram of a particular embodiment of a system 10 that performs enforcement of security policies for kernel module loading is shown. The system 10 includes an executable file FOO 12 and a loader (insmod) 14 and a Local Event Manager 22 in a user space of the system. The executable file is processed by the loader 14 such as by modifying the file, reorganizing the file and the like to produce an object code file (e.g., BUF 16) and presents the object code file (e.g. BUF 16) to the kernel. Also shown is a Rule Engine 18, which is in communication with a file shim 20, a Syscall shim 24 and a local event manager 22.

In a particular example, a Linux based system is used. A system call request for a kernel loadable module such as the object code file BUF 16 is intercepted by the Syscall shim 24. The syscall shim 24 is in charge of hooking module load syscalls, and will do analysis on the Object Code (buf). The file shim 20 sends information about opened files to the Rule Engine 18. This information may include the file type, particularly that the file's header is that of a kernel loadable module. The header includes information that the file is an ELF-format executable, with the subtype DLL (dynamically loaded library). The system call is run through the Rule Engine 18 to ensure compliance with intrusion prevention measures being taken by the system.

The Rule Engine 18 determines a file path for the requested KLM, the file path mapping a location of the executable file Foo 12 the requested KLM was produced from. The Rule Engine 18 determines the file path by maintaining state information regarding executable files that are opened by a process and providing a mapping between the KLM object code file and the corresponding executable file. The Rule Engine 18 may maintain a list of files for every process. In this example, the path where the executable FOO 12 can be found was determined when the loader 14 read the file FOO 21 and presented the file to the kernel. The Rule Engine 18 in this example maintains state information by keeping track of which files are opened by which processes and by tying a module-load system call to the previously opened KLM, thereby determining the KLM file path.

The rule engine 18 then applies the security policy to the file path. A HIPS administrator can set a policy whose rules specify certain kernel-module loading parameters such as module names, application classes for module-loading programs, and action taken: allow/deny/terminate the module-loading program/monitor/query user. For example a policy can allow only the modules in /lib/modules/trusted_modules to load, and deny loading of all other modules.

When the file path fails to trigger any security policy rules then the KLM operation is allowed to complete. On the other hand when the file path triggers a security policy rule then appropriate action as defined by the security policy is taken. Appropriate action may include terminating the application requesting the KLM, tagging the application requesting the KLM, allowing operation of the application requesting the KLM, denying the request for the KLM, quarantining the KLM and monitoring the process that requested the KLM. The implementation can also be extended with hash/signature-matching. The Rule Engine can request the user-level agent process (also referred to as the Local Event Manager) to calculate and send the hash of the module executable file and compare it with the hash of the memory buffer in the create_module system call.

By way of the above described example, kernel module loading is controlled for intrusion-prevention purposes. The present method for providing enforcement of security policies for kernel module loading provides highly configurable protection without the negatives of exclusively signature-based approaches.

Figure 2A:
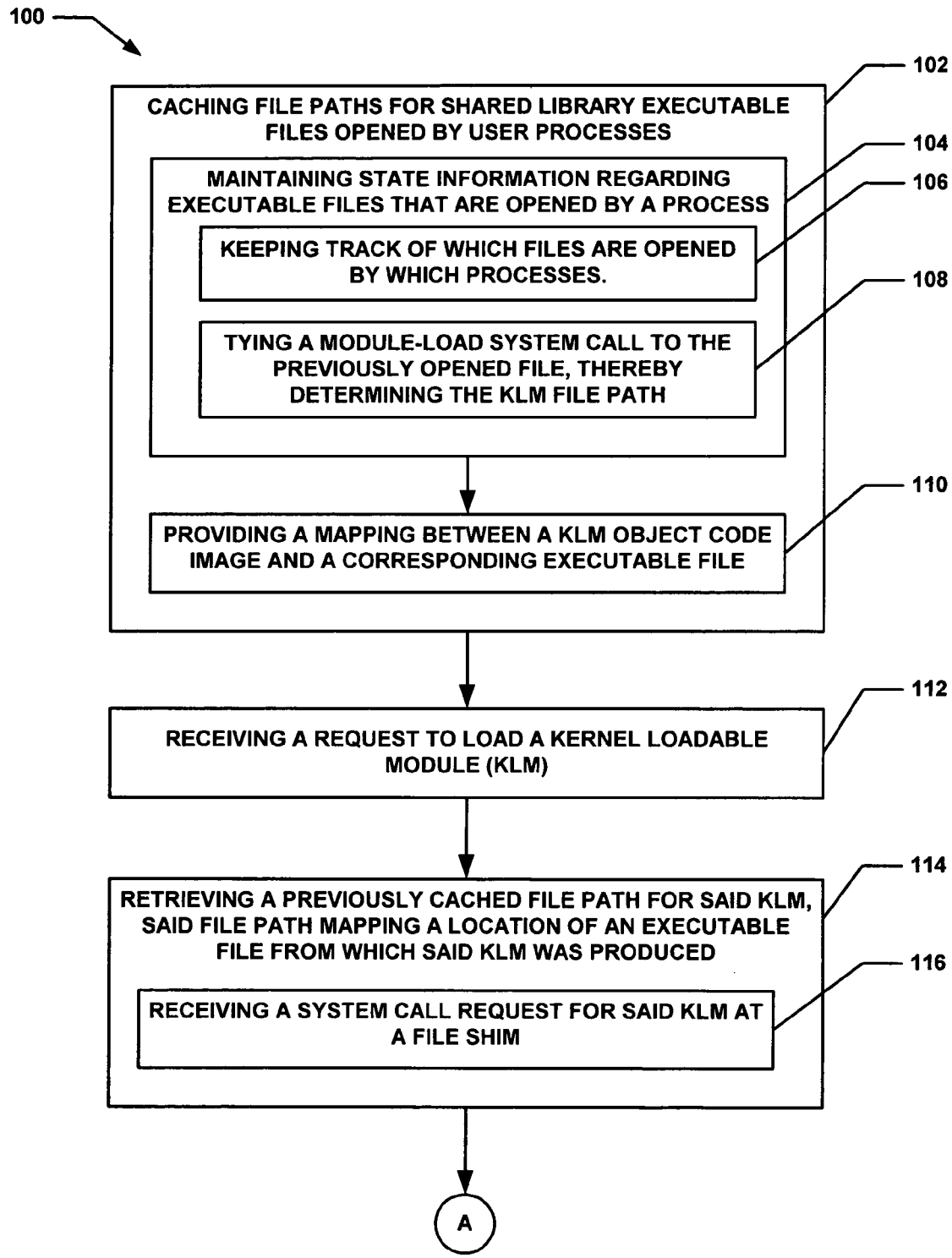
FIG. 2A is a first part of a flow diagram for a particular embodiment of a method that performs enforcement of security policies for kernel module loading in accordance with embodiments of the invention.
Figure 2B:
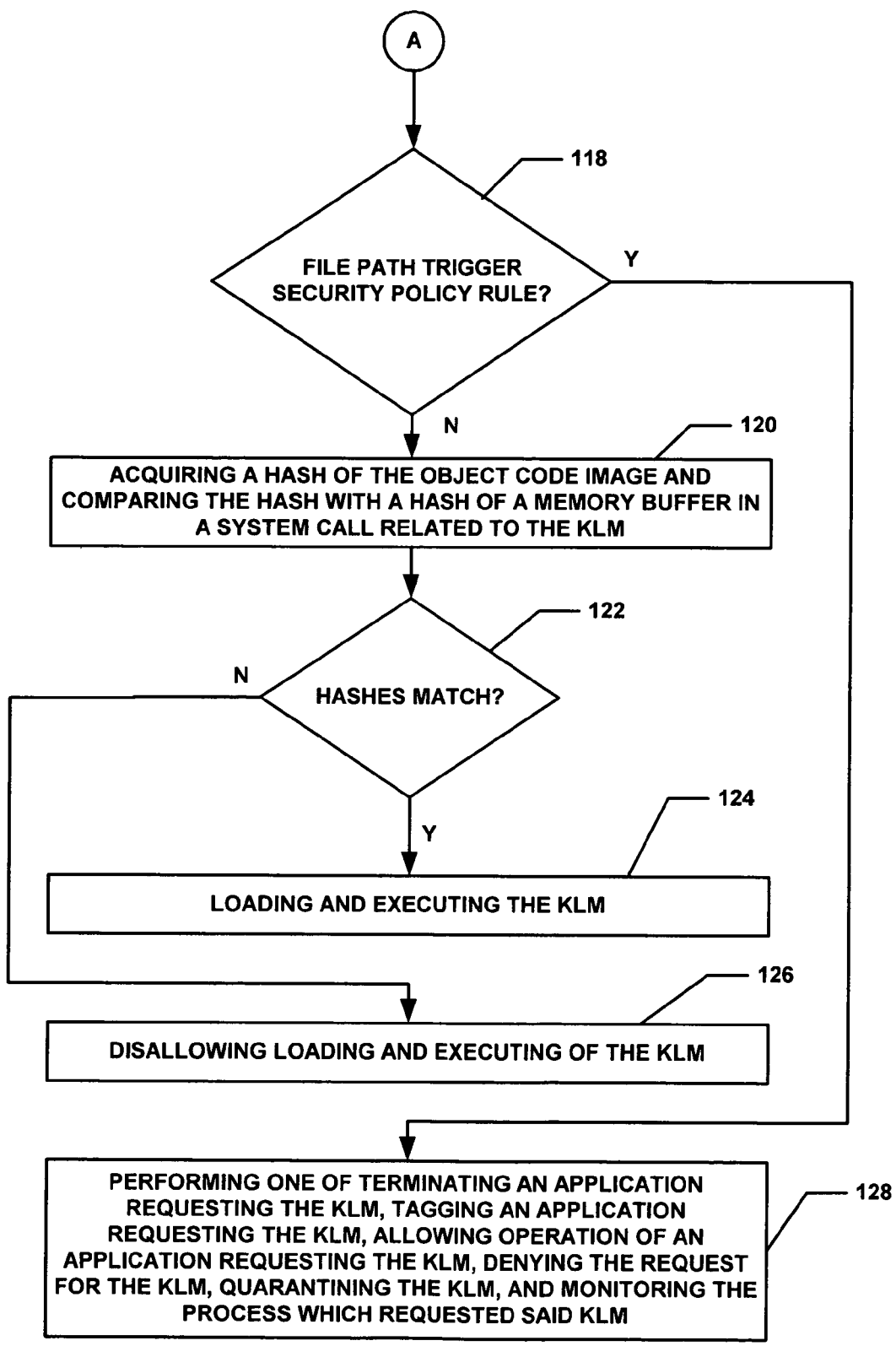
FIG. 2B is a second part of the flow diagram of FIG. 2A.

A flow chart of the presently disclosed method is depicted in FIGS. 2A and 2B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 100 of providing enforcement of security policies for kernel module loading is shown. The method begins with processing block 102 wherein file paths for shared library executable files opened by user processes are cached. As recited in processing block 104, the caching of file paths includes maintaining state information regarding executable files that are opened by a process. As further recited in processing blocks 106 and 108 maintaining state information includes keeping track of which files are opened by which processes and tying a module-load system call to the previously opened file, thereby determining the KLM file path. As recited in processing block 110, the caching file paths includes providing a mapping between a KLM object code file and a corresponding executable file.

In processing block 112, a request for a kernel loadable module (KLM) is received. An example would be a system call requesting an executable module.

In processing block 114, as a result of receiving the request to load a KLM, a previously cached file path for the KLM is retrieved. The file path maps a location of an executable file from which the KLM was produced. An example of this may be: /lib/modules/trusted_modules. In processing block 116 the receiving a request for a KLM comprises receiving, at a file shim, the system call request for the KLM.

In decision block 118, a determination is made regarding whether the file path triggered a security policy rule. For example a security policy can allow only the modules in /lib/modules/trusted_modules to load, and deny loading of all other modules. When the file path triggers a security policy rule, processing continues at processing block 128, and when the file path does not trigger a security policy rule processing continues at processing block 120.

In processing block 120, in an alternate embodiment, a hash of the object code image is obtained and compared with a hash of a memory buffer in the system call related to the KLM. In decision block 122, a determination is made regarding whether the hash value of the memory buffer in the system call and the hash value of the object code image match. When the hash value of the memory buffer in the system call and the hash value of the object code image match, processing continues at processing block 124, and when the hash value of the memory buffer in the system call and the hash value of the object code image do not match then processing continues at processing block 126.

As recited in processing block 124, when the file path does not trigger a security policy the KLM is loaded and executed. In processing block 126, when the hashes do not match, then loading and executing of the KLM is disallowed.

In processing block 128, when the file path triggers a security policy rule appropriate action is taken. The appropriate action includes one or more of terminating an application requesting the KLM, tagging an application requesting the KLM, allowing operation of an application requesting the KLM, denying the request for the KLM, quarantining the KLM, and monitoring the process which requested the KLM.

Figure 3:
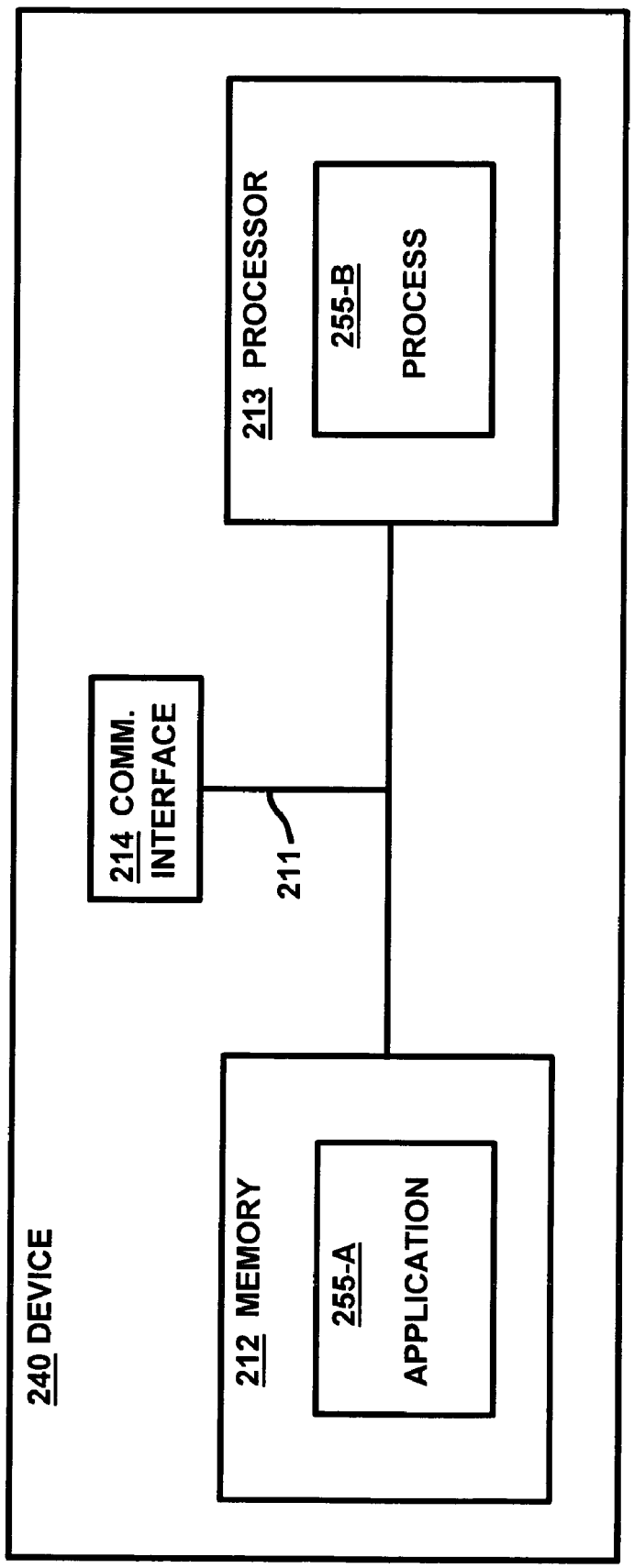
FIG. 3 illustrates an example computer system architecture for a computer system that performs enforcement of security policies for kernel module loading in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the agent application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing enforcement of security policies for kernel module loading comprising:

caching file paths for shared library executable files opened by user processes;

receiving a request to load a kernel loadable module (KLM);

retrieving a previously cached file path for said KLM, said file path mapping a location of an executable file from which said KLM was produced; and applying a security policy to said file path, wherein when said file path triggers a security policy rule then taking an action associated with a triggered rule, and wherein when said file path does not trigger a security policy rule then said KLM request is allowed to proceed, wherein said caching file paths includes maintaining state information regarding executable files that are opened by a process, and said caching file paths further includes providing a mapping between a KLM object code image and a corresponding executable file.

2. The method of claim 1 wherein said maintaining state information includes keeping track of which files are opened by which processes.

3. The method of claim 2 wherein said maintaining state information further includes tying a module-load system call to the previously opened file, thereby determining the KLM file path.

4. The method of claim 1 wherein said taking an action associated with a triggered rule comprises one of the group consisting of terminating an application requesting said KLM, tagging an application requesting said KLM, allowing operation of an application requesting said KLM, denying said request for said KLM, quarantining said KLM, and monitoring a process which requested said KLM.

5. The method of claim 1 wherein said retrieving comprises receiving a system call request for said KLM at a file shim.

6. The method of claim 1 further comprising acquiring a hash value of said object code image.

7. The method of claim 6 further comprising comparing the object code image hash with a hash of a memory buffer in a system call related to said KLM, wherein when said object code image hash matches said hash of a memory buffer then said KLM is loaded and executed, and wherein when said object code image hash does not match said hash of a memory buffer then said KLM is not loaded.

8. The method of claim 1 wherein the security policy allows only modules stored in a predetermined directory of trusted modules to load, and denies loading of all other modules.

9. A computer readable storage medium having computer readable code thereon for providing enforcement of security policies for kernel module loading, the medium comprising:

instructions for caching file paths for shared library executable files opened by user processes;

instructions for receiving a request to load a kernel loadable module (KLM);

instructions for retrieving a previously cached file path for said KLM, said file path mapping a location of an executable file from which said KLM was produced; and
instructions for applying a security policy to said file path, instructions for taking an action associated with a triggered rule when said file path triggers a security policy rule, and instructions for allowing said request to proceed when said file path does not trigger a security policy rule,
wherein said instructions for caching file paths includes instructions for maintaining state information regarding executable files that are opened by a process and instructions for providing a mapping between a KLM object code image and a corresponding executable file.

10. The computer readable storage medium of claim 9 wherein said instructions for taking an action associated with a triggered rule comprises instructions for one of the group consisting of instructions for terminating an application requesting said KLM, instructions for tagging an application requesting said KLM, instructions for allowing operation of an application requesting said KLM, instructions for denying said request for said KLM, instructions for quarantining said KLM, and instructions for monitoring a process which requested said KLM.

11. The computer readable storage medium of claim 9 wherein the security policy allows only modules stored in a predetermined directory of trusted modules to load, and denies loading of all other modules.

12. A computer apparatus comprising:
a memory;
a processor;
a communications interface;
an interconnection mechanism coupling the memory, the processor and the communications interface; and
wherein the memory is encoded with an application providing enforcement of security policies for kernel module loading that when performed on the processor, provides a process for processing information, the process causing the computer apparatus to perform the operations of:
providing a rule engine in communication with a file shim and a local event manager, and wherein said rule engine caches file paths for shared library executable files opened by user processes; and
providing a syscall shim in communication with said rule engine, wherein the syscall shim intercepts a request to load a kernel loadable module (KLM), wherein a file path for said KLM is retrieved by the rule engine, said file path mapping a location of an executable file from which said KLM was produced, and wherein a security policy is applied to said file path by said rule engine, wherein when said file path triggers a security policy rule then an action associated with a triggered rule is taken, and wherein when said file path does not trigger a security policy rule then said KLM request is allowed to proceed,
wherein said rule engine maintains state information regarding executable files that are opened by a process and provides a mapping between a KLM object code image and a corresponding executable file.

13. The apparatus of claim 12 wherein said rule engine keeps track of which files are opened by which processes.

14. The apparatus of claim 13 wherein said rule engine ties a module-load system call to a previously opened file, thereby determining the KLM file path.

15. The apparatus of claim 12 wherein said action associated with a triggered rule comprises one of the group consisting of terminating an application requesting said KLM, tagging an application requesting said KLM, allowing operation of an application requesting said KLM, denying said request for said KLM, quarantining said KLM and monitoring the process which requested said KLM.

16. The apparatus of claim 12 wherein a hash value of said object code image is obtained.

17. The apparatus of claim 16 wherein the object code image hash is compared with a hash of a memory buffer in a system call related to said KLM, wherein when said object code image hash matches said hash of a memory buffer then said KLM is loaded and executed and wherein when said object code image hash does not match said hash of a memory buffer then said KLM is not loaded.

18. The apparatus of claim 12 wherein the security policy allows only modules stored in a predetermined directory of trusted modules to load, and denies loading of all other modules.

* * * * *

UNITED STATES PATENT AND TRADEMARK OFFICE
CERTIFICATE OF CORRECTION

| | |
|---|---|
| PATENT NO. | : 7,644,271 B1 |
| APPLICATION NO. | : 11/268232 |
| DATED | : January 5, 2010 |
| INVENTOR(S) | : Cherepov et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1094 days.

Signed and Sealed this

Twenty-first Day of December, 2010

David J. Kappos
*Director of the United States Patent and Trademark Office*